June 2, 1953  A. Y. DODGE  2,640,372
CONTROL MEANS FOR AUTOMOTIVE VEHICLES
Filed Dec. 16, 1950
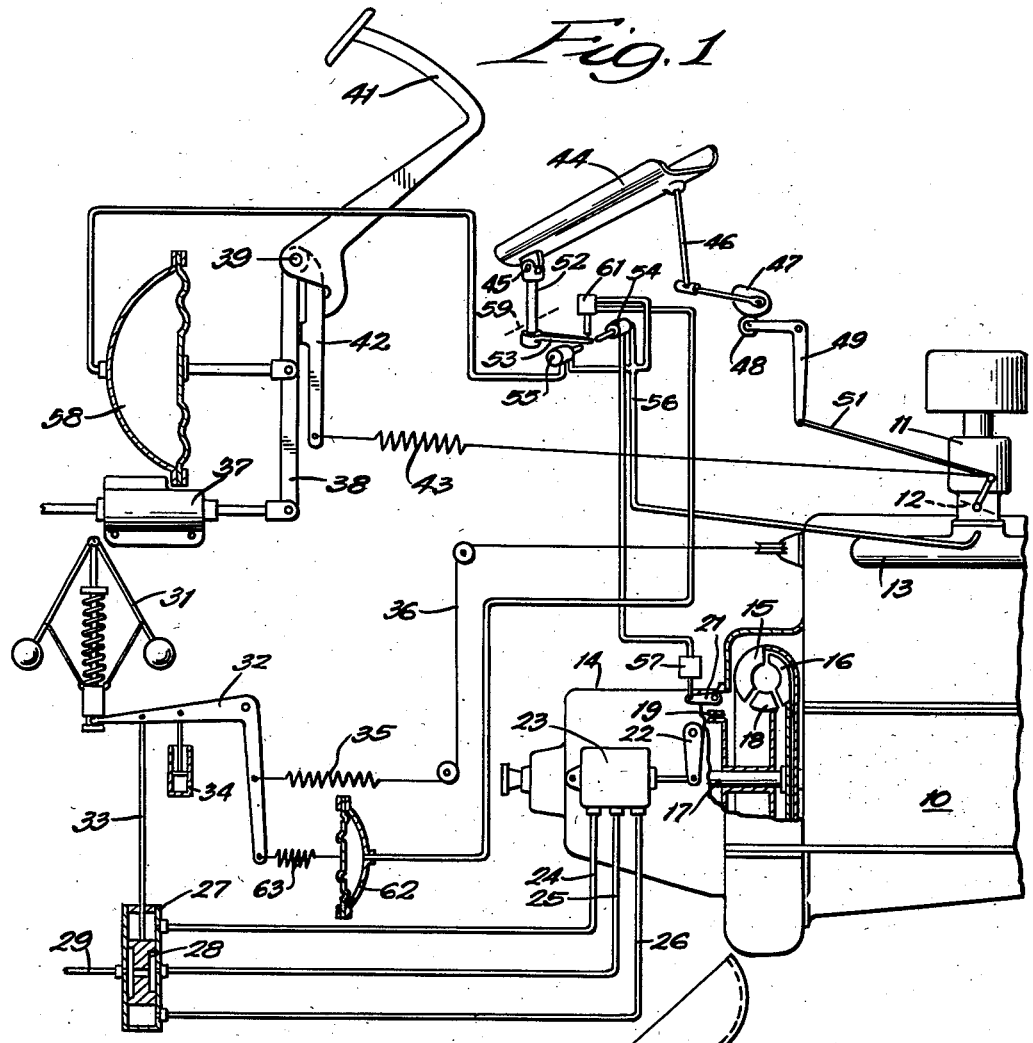
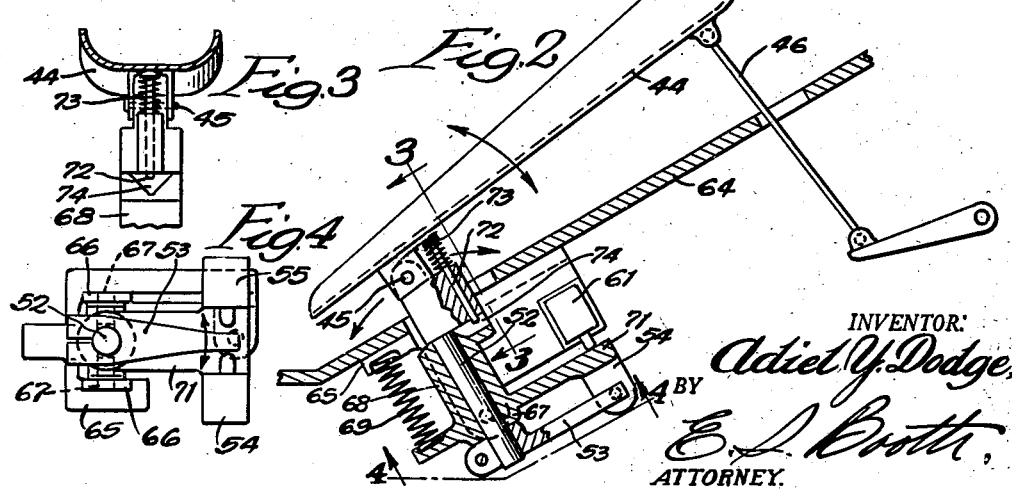
INVENTOR:
Adiel Y. Dodge,
BY E. L. Booth,
ATTORNEY.

Patented June 2, 1953

2,640,372

UNITED STATES PATENT OFFICE 2,640,372

CONTROL MEANS FOR AUTOMOTIVE VEHICLES

Adiel Y. Dodge, Rockford, Ill.

Application December 16, 1950, Serial No. 201,173

16 Claims. (Cl. 74—472)

This invention relates to control means for automotive vehicles, and more particularly to a pedal control for effecting a plurality of separate control operations.

In conventional types of automotive vehicles separate controls are provided for the transmission, the engine throttle, and the brakes. It has further been proposed to add an additional separately controlled brake for one of the elements of a hydraulic torque converter in the transmission to assist in hill braking. It has also been proposed, in vehicles utilizing an overdrive, to provide a kick down operated by depressing the accelerator pedal beyond the normal throttle control range. In this type of control the throttle must be fully opened before the kick down can be operated.

It is one of the objects of the present invention to provide a control means in which a plurality of separate control operations can be performed in response to different movements of a single pedal.

According to one feature of the invention, the pedal may control the engine throttle by one movement thereof, may control the transmission by a second movement to produce a kick down effect, may control the wheel brakes of the vehicle by a third movement, and may control a brake for one element of a hydraulic torque converter by a fourth movement.

According to another feature a latch mechanism is provided to prevent movement of the pedal to apply either of the brakes except when the throttle is closed.

According to still another feature, the pedal is connected to the throttle through a cam mechanism to provide a linear relationship between the pedal position and flow past the throttle. The brake pedal may also be connected to the throttle return spring to increase its tension and insure closing of the throttle when the brakes are applied.

Another object of the invention is to provide a control pedal capable of movements of three different types to effect at least three different control operations. In the preferred construction the pedal is mounted for normal pivoting movement in a vertical plane to control the throttle, for lateral swinging movement to effect different control operations and for bodily shifting to effect still another control operation.

The above and other objects and advantages of the invention will be more readily apparent from the following description when read in connection with the accompanying drawing, in which:

Figure 1 is a diagrammatic view illustrating a vehicle control embodying the invention; Figure 2 is a section with parts in elevation of the control pedal; Figure 3 is a partial section on the line 3—3 of Figure 2, and Figure 4 is a partial bottom view of the pedal on the line 4—4 of Figure 2.

As illustrated in Figure 1, the control of the invention is applied to a vehicle having an engine indicated at 10, supplied with combustible mixture by a carburetor 11 having a throttle valve 12 to control the engine speed. The carburetor delivers the mixture past the throttle valve to an intake manifold 13, which distributes the mixture to the engine cylinders in the usual manner.

The engine drives the vehicle through a transmission, including a gear box 14 connected to the engine through a hydraulic torque converter. As shown, the torque converter includes an impeller 15 connected to the engine to be driven thereby, a rotor 16 connected to a shaft 17 which leads into the gear box, and a stator 18. The stator may be held against rotation when desired to assist in hill braking by a brake 19 controlled by an operating lever 21.

The gear box contains elements shiftable to different positions to provide different driving ratios which may be controlled through a shifting lever 22. The lever 22 is moved to any one of three selected positions by a vacuum motor 23 having three vacuum supply lines 24, 25, and 26 connected to spaced points in its length. The motor 23 is controlled by a valve 27 having a shiftable plunger 28 therein, selectively to connect one or the other of the lines 24, 25, or 26 to a vacuum connection 29. With the valve in the position shown the center line 25 is connected to vacuum and the end lines 24 and 26 may be vented to atmosphere through the valve. At this time the piston in the motor 23 will move to a central position in which it covers the line 25 and will move the lever 22 to a corresponding central position to effect a desired torque ratio in the gear box, such, for example, as an intermediate forward drive. When the valve plunger 28 is moved down vacuum will be admitted to the line 26 to shift the lever 22 to the right for low gear drive, and when the plunger moves up vacuum will be admitted to the line 24 to shift the lever to the left for high gear drive.

The valve 28 may be controlled in response to vehicle operating conditions, and, as shown, is controlled in response to engine speed and torque. Speed is measured by a governor 31 which may be driven by the vehicle wheels or by the output shaft of the transmission to be responsive to the speed thereof. The governor is connected to one end of a bell crank lever 32 which is linked through a rod 33 to the valve plunger 28 to move it. Preferably a dash-pot 34 is provided to dampen governor movements.

Torque is measured by a spring 35 connected to the lever 32 and through a cord 36 to the upper part of the engine. The engine is preferably mounted for swinging movement about a longitudinal axis to dampen vibrations, and with this type of mounting the engine will swing in response to torque loads thereon. As it swings due to increased torque the cord 36 will be pulled to tension with spring 35, thereby to oppose governor movements. In this way control of the transmission is made automatically responsive to both speed and torque.

The vehicle is provided with the usual wheel brakes, not shown, which may be energized by a conventional hydraulic master cylinder 37 connected to an operating lever 38 pivoted at 39. The lever 38 is adapted to be moved by a brake pedal 41 having an extension 42 thereon which engages the lever 38 to move it in a direction to apply the brakes when the pedal 41 is depressed. The extension 42 is preferably connected to a throttle return spring 43, which is connected to the throttle 12 to close it. When the brake pedal is depressed tension of the spring 43 will be increased to insure that the throttle is closed when the brakes are applied.

The throttle is controlled by a control pedal indicated at 44, which is preferably trough shaped in section as shown to receive the foot of an operator firmly so that the pedal can be positively moved in any desired direction. The pedal is pivoted at one end on a horizontal pivot 45 for swinging movement in a vertical plane to control the throttle. For this purpose the opposite end of the pedal is connected through a link 46 to a cam 47 which engages a follower 48 on one end of a bell crank 49. The opposite end of the bell crank is connected to the throttle through a link 51. The cam 47 is so shaped that the throttle will be given a movement such as to compensate for its flow characteristics so that the flow past the throttle will be approximately linearly related to movement of the pedal. This provides a much easier control for the throttle, enabling the operator to control the vehicle speed more accurately and comfortably.

In addition to controlling the throttle, the pedal 44 is adapted to control the vehicle wheel brakes, the rotor brake 19, and the transmission. For controlling the brakes the pedal pivot 45 is supported at the upper end of a rotatable pin 52 extending downwardly from the pedal. An arm 53 is secured to the lower end of the pin 52 and is adapted to engage valve 54 or 55 when it is swung sideways in one direction or the other.

The valve 54 is connected to a vacuum supply line 56 which leads to the manifold 13. When the arm 53 engages and opens the valve 54 it connects the vacuum supply line 56 to a motor 57 for operating the brake lever 21. At this time the stator brake 19 is applied to hold the stator 18 stationary to assist in hill braking.

When the pedal is swung in the opposite direction to engage and open the valve 55 it connects the vacuum supply line 56 to a fluid motor 58, which is connected to the brake lever 38. At this time the brake lever will be swung to engage the wheel brakes to hold the vehicle stationary.

The motor 58 may be of such a size that it will apply the wheel brakes relatively lightly to prevent the vehicle from creeping, or to hold it on grades. It is intended for normal service applications that the conventional brake pedal 41 shall be used.

To control the transmission the pin 52 is supported for swinging about a horizontal axis 59 spaced below the axis 45. A valve 61 is mounted above the arm 53 to be engaged and held closed thereby when the pedal is in its normal position. When the pedal is shifted forward bodily about the axis 59, the arm will move away from the valve 61, allowing it to open. At this time the vacuum supply line 56 is connected to a fluid motor 62, which is connected through a spring 63 to the bell crank 32. When the motor 62 is connected to vacuum it increases the tension of the spring 63 to oppose movement of the governor 31 and tends to shift the transmission control valve 27 to shift the transmission to its next lower speed. This effect is generally similar to the kick down effect employed with overdrive transmissions, but can be obtained with any throttle opening, and serves actually to vary the speed at which the transmission will be shifted.

The construction of the control pedal is illustrated in detail in Figures 2, 3 and 4 wherein 64 represents the usual footboard or floor of the vehicle. As shown, the pedal is supported on a bracket 65 secured to the bottom of the footboard and having spaced depending ears 66 supporting horizontal pivots 67. A tubular supporting member 68 is pivotally supported by the pivots 67 and is normally held in the position shown in Figure 2 by a spring 69. An arm 71 projects forward from the support 68 and underlies and normally engages the control valve 61 to hold it closed. When the support is rocked clockwise about the pivots 67 the arm 71 will move away from the valve 61 and allow it open, as explained above.

The pin 52 is journaled in the support and carries the pivot 45 at its upper end to support the pedal 44. The pin 52 extends through an enlarged opening in the floor board 64 so that the pin and support can swing about the pivots 67 for bodily shifting of the pedal. At its lower end the pin 52 carries the arm 53 which lies between the control valves 54 and 55. As best seen in Figure 4, the control valves are carried by the arm 71 so that they will always be held properly in register with the arm 53 in all positions.

To prevent lateral swinging of the pedal to operate either of the brake controls when the throttle is open, a latch mechanism is provided. As shown, this mechanism comprises a latch pin 72 slidable through an enlargement at the upper end of the pin 52 and normally urged upward against the bottom of the pedal 44 by a spring 73. When the pedal 44 is depressed the lower end of the latch pin 72 will be moved into a groove 74 formed in the upper end of the support 68. At this time the pin will engage in the groove to prevent lateral swinging of the pedal so that it cannot be moved to engage either the wheel or rotor brakes except when it is in its raised throttle-closing position.

While one embodiment of the invention has been shown and described in detail, it will be understood that this is illustrative only and is not to be taken as a definition of the scope of the invention, reference being had for this purpose to the appended claims.

What is claimed is:

1. In an automotive vehicle having an engine, brakes, a variable speed transmission, and control means for the transmission, a control pedal, means mounting the pedal for pivotal movement in a vertical plane and for a second movement of a different type; a connection from the pedal to the engine to control the engine in response to said pivotal movement, and a connection from the pedal to the control means for the transmission to vary the operation of the control means in response to said second movement.

2. In an automotive vehicle having an engine, brakes, a variable speed transmission, and control means for the transmission, a control pedal, means mounting the pedal for pivotal movement in a vertical plane and for a second movement of a different type; a connection from the pedal to the engine to control the engine in response to said pivotal movement, said transmission including a hydraulic torque converter having a stator, and a brake to hold the stator against rotation controlled by said second movement of the pedal.

3. In an automotive vehicle having an engine, brakes, a variable speed transmission, and control means for the transmission, a control pedal, means mounting the pedal for pivotal movement in two different planes and for bodily shifting, a connection from the pedal to the engine to control the engine in response to pivotal movement of the pedal in one plane, and connections from the pedal to the brakes and the control means for the transmission to operate the brakes and the control means individually in response to pivotal movement of the pedal in the other plane and to bodily shifting of the pedal.

4. In an automotive vehicle having an engine, brakes, a variable speed transmission, and control means for the transmission, a control pedal, means mounting the pedal for pivotal movement in two different planes and for bodily shifting, a connection from the pedal to the engine to control the engine in response to pivotal movement of the pedal in one plane, the transmission including a hydraulic torque converter having a stator, a stator brake to hold the stator against rotation, and connections from the pedal to the brakes, the stator brake, and the transmission control means to vary the operation of the control means when the pedal is shifted bodily, to apply the brakes when the pedal is pivoted in one direction in the other plane, and to apply the stator brake when the pedal is pivoted in the other direction in the other plane.

5. In an automotive vehicle having an engine and a transmission and control means for the transmission, a control pedal, means mounting the pedal for pivotal movement in a vertical plane and for bodily shifting movement, a connection from the pedal to the engine to control the engine in response to pivotal movement of the pedal, and a connection from the pedal to the control means for the transmission to vary the operation of the control means in response to bodily shifting of the pedal.

6. In an automotive vehicle having an engine and a transmission and control means for the transmission, a control pedal, means mounting the pedal for pivotal movement in a vertical plane and for a second movement of a different type; a connection from the pedal to the engine to control the engine in response to pivotal movement of the pedal, means automatically responsive to the operating conditions of the engine to operate the control means for the transmission, and a connection from the pedal to the last named means to vary the operation thereof in response to the second movement of the pedal.

7. In an automotive vehicle having an engine and a transmission and control means for the transmission, a control pedal, means mounting the pedal for pivotal movement in a vertical plane and for a second movement of a different type; a connection from the pedal to the engine to control the engine in response to pivotal movement of the pedal, means including a device movable in response to the speed of the engine to operate the control means for the transmission, and a connection from the pedal to said device to vary the loading thereon in response to the second movement of the pedal.

8. In an automotive vehicle having an engine with a throttle valve, a transmission, and brakes, a control pedal, means mounting the pedal for pivotal movement in a vertical plane, and for a second movement of a different type, a spring urging the throttle in one direction, a connection from the pedal to the throttle to move it in the other direction when the pedal is depressed, a brake pedal, and a connection from the brake pedal to the spring to increase the spring tension when the brake pedal is depressed.

9. In an automotive vehicle having an engine with a throttle valve, a transmission, and brakes, a control pedal, means mounting the pedal for pivotal movement in a vertical plane and for a second movement of a different type, a spring urging the throttle in one direction, a cam connected to the pedal to be turned thereby when the pedal is depressed, linkage engaging the cam and connected to the throttle to open it when the pedal is depressed, the cam being shaped to compensate for the throttle characteristics so that flow past the throttle will be substantially linearly related to movement of the pedal, a brake pedal, and a connection from the brake pedal to the spring to increase the spring tension when the brake pedal is depressed.

10. In an automotive vehicle having an engine with a throttle valve, a transmission, and brakes, a control pedal, means mounting the pedal for pivotal movement in a vertical plane and for a second movement of a different type, a spring urging the throttle in one direction, a connection from the pedal to the throttle to move it in the other direction when the pedal is depressed, a brake pedal, a brake linkage positioned to be loosely engaged by the brake pedal to apply the brakes when the brake pedal is depressed, power means to move the brake linkage independently of the pedal, control means for the power means connected to the control pedal to be operated by said second movement thereof, means to prevent said second movement of the control pedal except when it is in a position to close the throttle, and a connection from the brake pedal to the spring to increase its tension when the brake pedal is depressed.

11. A control pedal for an automotive vehicle comprising an elongated pedal member, means at one end of the member for connecting it to a throttle linkage, a movable support, a pin journaled in the support to which the other end of the pedal member is pivoted on a horizontal axis transverse to the pin length, control means operated by turning of the pin in the support, and control means operated by movement of the support.

12. A control pedal for an automotive vehicle comprising an elongated pedal member, means at one end of the member for connecting it to a throttle linkage, an elongated tubular support, an elongated pin journaled in the support to which the other end of the pedal member is pivoted on a horizontal axis transverse to the pin, means pivotally mounting the support on a horizontal axis spaced from the first named axis, control means operated by turning of the pin in the support, and control means operated by movement of the support about the last named axis.

13. A control pedal for an automotive vehicle comprising an elongated pedal member, means at one end of the member for connecting it to a throttle linkage, an elongated tubular support, an elongated pin journaled in the support to which the other end of the pedal member is pivoted on a horizontal axis transverse to the pin, means pivotally mounting the support on a horizontal axis, spaced from the first named axis, control means operated by turning of the pin in the support, control means operated by movement of the support about the last named axis, and latch means operated by movement of the pedal member and holding the pin against turning in the support when the pedal member is depressed.

14. A control pedal for an automotive vehicle comprising an elongated pedal member, means at one end of the member for connecting it to a throttle linkage, a support, a pin journaled in the support to which the other end of the pedal member is pivoted on a horizontal axis transverse to the pin, control means operated by turning of the pin in the support, and latch means to hold the pin against turning in the support and having a part lying in the path of movement of the pedal to be moved to engaged position when the pedal is depressed.

15. In an automative vehicle having an engine and a transmission mechanism shiftable to a plurality of speed ratios and control means responsive to speed, means controlled by the control means to shift said mechanism to a high speed ratio when the speed is above a predetermined minimum, a control pedal, means mounting the control pedal for pivotal movement in a vertical plane and for a second movement of a different type, a connection from the control pedal to the engine to control the engine in response to said pivotal movement, and a connection from the control pedal to the control means to urge the control means toward a lower speed ratio position in response to said second movement of the control pedal.

16. In an automative vehicle having an engine and a transmission mechanism shiftable to a plurality of speed ratios and control means responsive to speed, means controlled by the control means to shift said mechanism to a high speed ratio when the speed is above a predetermined minimum, a control pedal, means mounting the control pedal for pivotal movement in a vertical plane and for a second movement of a different type, a connection from the control pedal to the engine to control the engine in response to said pivotal movement, a vacuum motor connected to the control means to urge it toward a lower speed ratio position, a control valve for the motor, and a connection from the control valve to the control pedal to open the control valve in response to said second movement of the pedal.

ADIEL Y. DODGE.

References Cited in the file of this patent

UNITED STATES PATENTS

| Number | Name | Date |
|---|---|---|
| 1,230,426 | Murray | June 19, 1917 |
| 1,236,489 | Sears | Aug. 14, 1917 |
| 1,453,509 | Lane | May 1, 1923 |
| 1,457,489 | Barton | June 5, 1923 |
| 1,535,867 | Sears | Apr. 28, 1925 |
| 1,711,988 | Brochon | May 7, 1929 |
| 2,060,731 | Harroun | Nov. 10, 1936 |